Patented May 8, 1945

2,375,185

UNITED STATES PATENT OFFICE 2,375,185

MANUFACTURE OF METHOXYMETHYLENE-MALONITRILE

Franz Bergel, Aaron Cohen, and John Wynne Haworth, Welwyn Garden City, England, assignors to Roche Products Limited, Welwyn Garden City, Hertfordshire, England No Drawing. Application March 4, 1942, Serial No. 433,343. In Great Britain October 10, 1940

1 Claim. (Cl. 260—464)

This invention relates to the manufacture of hydroxymethylene-malonitrile, certain of its salts, and to its alkyl derivatives, namely, alkoxymethylene-malonitrile compounds.

It is known that alkoxymethylene derivatives of malonitrile can be produced by the condensation of malonitrile with alkyl esters of orthoformic acid in the presence of acetic anhydride.

It has now been found according to the present invention that such alkoxymethylene derivatives of malonitrile can be obtained by the alkylation of the metallic salts of hydroxy-methylene-malonitrile, such as the potassium salt, $$KOCH=C(CN)_2$$

The latter can be obtained as described by Schenck and Finken (Annalen, 1928, 462, 170) by condensing ethyl formate with malonitrile in the presence of potassium ethoxide. Such a suitable metallic salt is alkylated by treatment with a suitable alkylating agent such as methyl sulphate, in which case methoxymethylene-malonitrile is obtained according to the equation:

$$KO.CH=C(CN)_2 + (CH_3)_2SO_4 \rightarrow CH_3OCH=C(CN)_2 + K(CH_3)SO_4$$

It is clear that, alternatively, another metallic salt, such as the sodium salt, whose preparation is described in an example below, may also be employed in this alkylation.

Furthermore, a salt such as the silver salt of hydroxy-methylene-malonitrile may be alkylated by treatment with an alkyl halide, e. g., ethyl iodide, when the reaction proceeds according to the equation:

$$AgOCH=C(CN)_2 + C_2H_5I \rightarrow C_2H_5OCH=C(CN)_2 + AgI$$

yielding ethoxymethylene-malonitrile.

The previously unknown methoxymethylene-malonitrile, like its homologues, is capable of ready conversion into amino-methylene-malonitrile by treatment with concentrated aqueous ammonia.

The free acid, hydroxymethylene-malonitrile, is obtained by treating the alkali metal salts with the calculated amount of a suitable solution of a mineral acid in organic solvent, e. g., an anhydrous ethereal solution of hydrogen chloride. It has also been found that when hydroxymethylene-malonitrile is treated with pure ammonia or with ammonia in aqueous solution or with a solution of amomnia in an organic solvent the crystalline ammonium salt of hydroxymethylene-malonitrile, $NH_4OCH=C(CN)_2$ is obtained.

The following examples illustrate how the processes of the invention may be carried into effect:

1. 6.3 gms. of the finely powdered potassium salt of hydroxymethylene-malonitrile, prepared as described by Schenck and Finken (loc. cit.), are heated with stirring with 30 ccs. of methyl sulphate at 100° C. for 7 hours. The resulting mixture is filtered and the residue well washed with ether. The combined filtrates are freed from solvent and excess of methyl sulphate and the residual oil distilled in vacuo, yielding 2.6 gms. of methoxymethylene-malonitrile, b. pt. 155–157° C./15 mm., which crystallises from a mixture of alcohol and light petroleum in colourless prisms which have M. Pt. 93° C. This compound dissolves in concentrated aqueous ammonia and the solution soon deposits crystals of amino-methylene-malonitrile, M. Pt. 140° C.

2. The sodium salt of hydroxymethylene-malonitrile is prepared as follows, though not in a perfectly pure condition: A solution of 3.45 gms. of sodium in 100 ccs. of absolute ethyl alcohol is added dropwise with stirring to an ice-cooled solution of 6.6 gms. of malonitrile and 11.25 gms. of ethyl formate in 50 ccs. of absolute alcohol and 50 ccs. of anhydrous ether. The substance which separates out when the mixture is kept at room temperature overnight is filtered off and discarded and the filtrate is concentrated under reduced pressure, when the required sodium salt separates out and is filtered off. A further quantity is obtained by adding anhydrous ether to the mother liquor. In all 10.4 gms. of this sodium salt are obtained.

This is dried and heated with stirring at 100° C. for 5 hours with 50 ccs. of methyl sulphate. The mixture is filtered and the residue washed with hot benzene. After removal of the solvent and excess of methyl sulphate the methoxymethylene-malonitrile is again isolated in the manner described above in Example 1.

3. The silver salt of hydroxymethylene-malonitrile is obtained by adding the calculated amount of silver nitrate in aqueous solution to an aqueous solution of the sodium salt obtained as described in Example 2. It is filtered off, and dried in vacuo over phosphoric anhydride. 5 gms. of this salt are suspended in 20 ccs. of dry benzene and 10 gms. of ethyl iodide, and the mixture refluxed for 48 hours. After filtering off the solid remaining and washing it with ether, the solvents are removed from the filtrate and the residue purified by vacuum distillation which yields 1.4 gms. of ethoxymethylene-malonitrile.

4. The free acid, hydroxymethylene-malonitrile is prepared as follows:

5.3 gms. of the potassium salt of hydroxymethylene-malonitrile are shaken for several hours with 21 ccs. of 1.9 N-anhydrous ethereal hydrogen chloride. The potassium chloride, which is formed, is filtered off and the filtrate evaporated, yielding 3.0 gms. of hydroxymethylene-malonitrile which crystallises from a mixture of ethyl acetate and light petroleum in colourless needles, M. Pt. 130° C.

5. The ammonium salt of hydroxymethylene-malonitrile is prepared by dissolving the free acid in concentrated aqueous ammonia. The solution is allowed to evaporate slowly when the product crystallises out. It crystallises from alcohol in colourless plates, M. Pt. 165–166° C.

6. The ammonium salt mentioned in Example 5 may also be prepared by adding a slight excess of saturated alcoholic ammonia to a solution of the free hydroxymethylene-malonitrile (1.6 gm.) in alcohol (2 ccs.) The salt separates out rapidly and is filtered off. It is identical with the ammonium salt obtained as described in Example 5.

7. The same ammonium salt as described in Examples 5 and 6 is also obtained when the free hydroxymethylene-malonitrile is dissolved in liquid ammonia and the solution allowed to evaporate after a short time. The residue is identical with the products described above in Examples 5 and 6.

We claim:

Process for the manufacture of methoxymethylene-malonitrile which comprises heating an alkali metal salt of hydroxymethylene-malonitrile with methylsulfate while stirring, filtering the resulting residue, washing it with ether, freeing the combined filtrates from solvent and excess of methylsulfate and distilling the residual oil in vacuo to obtain the pure methoxymethylene-malonitrile.

FRANZ BERGEL.
AARON COHEN.
JOHN WYNNE HAWORTH.